(12) United States Patent
Yang

(10) Patent No.: US 10,516,540 B2
(45) Date of Patent: Dec. 24, 2019

(54) MANAGEMENT OF PROFILES IN AN EMBEDDED UNIVERSAL INTEGRATED CIRCUIT CARD (EUICC)

(71) Applicant: Apple Inc., Cupertino, CA (US)

(72) Inventor: Xiangying Yang, Cupertino, CA (US)

(73) Assignee: Apple Inc., Cupertino, CA (US)

(*) Notice: Subject to any disclaimer, the term of this patent is extended or adjusted under 35 U.S.C. 154(b) by 121 days.

(21) Appl. No.: 15/418,200

(22) Filed: Jan. 27, 2017

(65) Prior Publication Data

US 2017/0222991 A1    Aug. 3, 2017

Related U.S. Application Data

(60) Provisional application No. 62/288,152, filed on Jan. 28, 2016.

(51) Int. Cl.

| H04L 9/32 | (2006.01) |
|---|---|
| H04L 9/00 | (2006.01) |
| H04L 29/06 | (2006.01) |
| H04W 12/04 | (2009.01) |
| G09C 1/00 | (2006.01) |

(Continued)

(52) U.S. Cl.
CPC .............. *H04L 9/3247* (2013.01); *G09C 1/00* (2013.01); *H04L 9/006* (2013.01); *H04L 9/0825* (2013.01); *H04L 9/14* (2013.01); *H04L 9/3242* (2013.01); *H04L 63/061* (2013.01); *H04L 63/20* (2013.01); *H04W 12/0023* (2019.01); *H04W 12/04* (2013.01); *H04W 12/0806* (2019.01); *H04L 63/0823* (2013.01); *H04L 63/126* (2013.01); *H04W 12/10* (2013.01)

(58) Field of Classification Search
CPC ..... H04L 9/3247; H04L 9/006; H04L 63/061; H04L 63/20; H04L 63/0823; H04L 63/126; H04W 12/04; H04W 12/10
USPC ........................................................ 713/155
See application file for complete search history.

(56) References Cited

U.S. PATENT DOCUMENTS 9,223,967 B2 *  12/2015  Ghose ................... G06F 9/3851
9,722,975 B2 *  8/2017   Yang .................... H04L 63/0428
(Continued)

OTHER PUBLICATIONS

GSM Association; Official Document SGP.01—Embedded SIM Remote Provisioning Architecture, Version 1.1, Jan. 30, 2014, 85 pages.

(Continued)

*Primary Examiner* — Khalil Naghdali
(74) *Attorney, Agent, or Firm* — Dickinson Wright RLLP

(57) ABSTRACT

Consumer/enterprise and machine-to-machine functions in wireless devices have led to a need for end user consent, security of profile data while permitting remote profile management, and mixed profile types in a shared embedded Universal Integrated Circuit Card (eUICC). User consent is provided by the device or by the eUICC parsing an incoming profile management command and triggering a user prompt on a user interface. Security of profile data while permitting operation of remote profile management commands is obtained by authentication procedures. In some embodiments, control of command influence is also obtained by providing policy control functions at the profile level. Mixed profile types are supported by creating multiple security domains within the eUICC. Authentication is performed on a public key infrastructure (PKI) basis or on a pre-shared symmetric key basis.

20 Claims, 13 Drawing Sheets

(51) Int. Cl.
*H04L 9/08* (2006.01)
*H04L 9/14* (2006.01)
*H04W 12/08* (2009.01)
*H04W 12/00* (2009.01)
*H04W 12/10* (2009.01)

(56) References Cited

U.S. PATENT DOCUMENTS

| | | | |
|---|---|---|---|
| 2011/0004926 A1* | 1/2011 | O'Donnell, III | G06F 21/305 |
| | | | 726/7 |
| 2015/0281942 A1* | 10/2015 | Lee | H04W 48/16 |
| | | | 455/434 |
| 2015/0312758 A1* | 10/2015 | Redford | H04W 12/04 |
| | | | 455/410 |
| 2016/0007190 A1* | 1/2016 | Wane | H04W 4/50 |
| | | | 455/419 |
| 2016/0241537 A1* | 8/2016 | Cha | H04W 12/04 |
| 2016/0283216 A1* | 9/2016 | Gao | H04W 8/20 |
| 2016/0316356 A1* | 10/2016 | Li | H04W 8/183 |
| 2016/0330624 A1* | 11/2016 | Lee | H04W 12/06 |
| 2016/0352698 A1* | 12/2016 | Long | H04W 12/08 |
| 2017/0232830 A1* | 8/2017 | Waskie | B60K 5/1275 |
| | | | 180/291 |
| 2018/0041601 A1* | 2/2018 | Park | H04W 12/04031 |
| 2018/0278604 A1* | 9/2018 | Yang | H05K 999/99 |

OTHER PUBLICATIONS

GSM Association; Official Document SGP.21—RSP Architecture, Version 1.0, Dec. 23, 2015, 52 pages.
GSM Association; Official Document SGP.02—Remote Provisioning Architecture for Embedded UICC Technical Specification, Version 3.0, Jun. 30, 2015, 301 pages.

* cited by examiner

MANAGEMENT OF PROFILES IN AN EMBEDDED UNIVERSAL INTEGRATED CIRCUIT CARD (EUICC)

BENEFIT CLAIM

This application claims the benefit of U.S. Provisional Patent Application No. 62/288,152 entitled "MANAGEMENT OF PROFILES IN AN EMBEDDED UNIVERSAL INTEGRATED CIRCUIT CARD (eUICC)" filed on Jan. 28, 2016, which is hereby incorporated by reference.

FIELD

The described embodiments relate to remote and local management of an embedded universal integrated circuit card (eUICC).

BACKGROUND

Aspects of Remote SIM (Subscriber Identity Module) provisioning include the downloading, installing, enabling, disabling, switching and deleting of a profile on an eUICC. An eUICC is a secure element for hosting profiles. A profile is a combination of operator data and applications provisioned on an eUICC in a device for the purposes of providing services by an operator. A profile can contain one or more secure data used to prove identity and thus verify contract rights to services. During assembly of a device, the eUICC can be inserted into the device by an eUICC manufacturer.

There is a need to improve profile management of an eUICC in consumer/enterprise environments and in machine-to-machine environments and in mixed scenarios.

A profile can be identified by a unique number called an Integrated Circuit Card Identifier (ICCID). Profile management can include a combination of local and remote management operations such as enable profile, disable profile, delete profile, and query profiles present on an eUICC. An operator is a company providing wireless cellular network services. A mobile network operator (MNO) is an entity providing access capability and communication services to its subscribers through a mobile network infrastructure. In some cases, the device is user equipment used in conjunction with an eUICC to connect to a mobile network. In a machine-to-machine (M2M) environment, a device may not be associated with a user and may have no user interface. An end user is a person using a (consumer or enterprise) device. An enabled profile can include files and/or applications which are selectable over an eUICC-device interface.

A function which provides profile packages is known as a subscription manager data preparation (SM-DP, also referred to as SM-DP+). An SM-DP may also be referred to as a profile provider or as an eSIM vendor. An eSIM is an electronic SIM. An eSIM is an example of a profile. A profile package can be a personalized profile using an interoperable description format that is transmitted to an eUICC as the basis for loading and installing a profile. Profile data which is unique to a subscriber, e.g., a phone number or an International Mobile Subscriber Identity (IMSI), are examples of personalization data. The SM-DP communicates over an interface with an eUICC. Certificates used for authentication and confidentiality purposes can be generated by a trusted certificate issuer.

There is a need to improve ability to manage profiles in an eUICC while only granting profile access to authorized parties.

An architecture framework related to remote provisioning and management of eUICCs in devices is outlined in GSM Association document GSMA SGP.21: "RSP Architecture," Version 1.0 Dec. 23, 2015 (hereinafter "SGP.21"). Remote provisioning and management of eUICCs in machine-to-machine devices which are not easily reachable is discussed in GSMA SGP.02: "Remote Provisioning Architecture for Embedded UICC Technical Specification," Version 3.0, Jun. 30, 2015 (hereinafter "SGP.02").

An eUICC includes an operating system, and the operating system can include ability to provide authentication algorithms to network access applications associated with a given operator. The operating system also can include the ability to translate profile package data into an installed profile using a specific internal format of the eUICC. An ISD-P (issuer security domain-profile) can host a unique profile within an eUICC. The ISD-P is a secure container or security domain for the hosting of the profile. The ISD-P is used for profile download and installation based on a received bound profile package. A bound profile package is a profile package which has been encrypted for a target eUICC. An ISD-R (issuer security domain-root) is a function in a eUICC responsible for the creation of new ISD-Ps on the eUICC. An ECASD (embedded UICC controlling authority security domain) provides secure storage of credentials required to support the security domains on eUICC 102. A controlling authority security domain (CASD) may also be referred to as a "key store" herein. A security domain within the eUICC contains the operator's over the air (OTA) keys and provides a secure OTA channel. OTA keys are credentials used by an operator for remote management of operator profiles on an eUICC.

Interest is becoming widespread in the use of eUICCs in both consumer/enterprise devices such as mobile phones and in machine-to-machine environments, for example, in cars.

A machine-to-machine environment is one in which devices communicate with each other directly. A phenomenon called the Internet of Things (IOT) includes sensors, cameras, cars, and utility meters having internet addresses. For example, one machine-to-machine concept includes utility meters aggregating data and uploading it via a wireless network. Some profile management operations in a machine-to-machine environment are carried out through an SM-SR (subscription manager secure routing). An SM-DP communicates with a eUICC directly or through an SM-SR. An MNO can communicate with an eUICC directly or through an SM-SR.

An eUICC for use in a machine-to-machine environment comprises several security domains for the purpose of profile management. Identifiers are associated with security domains. Applications within a security domain have a trust relationship. Further description of security domains is available in GSMA SGP.01: "Embedded SIM Remote Provisioning Architecture," Version 1.1, Jan. 30, 2014.

Some problems or challenges with profile management on eUICCs in consumer/enterprise devices and in M2M devices are: i) lack of end user consent when an MNO may wish to manage a profile within an end user's device, ii) an MNO requirement that only their contracted SM-DP have an ability to perform profile management on a profile associated with the MNO, and iii) a need to have machine-to-machine profiles and consumer or enterprise profiles share the same eUICC.

SUMMARY

Representative embodiments set forth herein disclose various systems and techniques for remote and local management of an eUICC.

In order to obtain end user consent before performing an incoming profile management command, metadata is provided in the command. The metadata is the basis for a prompt presented to an end user through the user interface. The prompt can originate from device interpretation of the incoming command, or the prompt can originate from the eUICC after the eUICC has received the incoming command.

An MNO will want assurance that another party cannot manipulate a profile associated with the MNO. In some embodiments disclosed herein, an ISD-R evaluates security and authorization of an incoming message for the addressed profile. The ISD-R evaluates who belongs to a trusted chain of authority for the profile, where the trusted chain of authority is indicated by identity and/or key set information in the ECASD of the eUICC.

Mixed profile types in a shared eUICC are enabled by embodiments disclosed herein. In some embodiments, an eUICC includes multiple security domains with one or more profiles within each of the multiple security domains. An actor with a first credential for a first security domain can perform profile management functions or operations on each of the profiles within the first security domain based on the first credential. Before a command reaches a profile within a given security domain, end user consent is obtained in some embodiments.

In some embodiments, mixed profile types are enabled by embodiments described herein using a policy control function in two or more of the profiles in the eUICC. A policy control function is provided for each profile, in some embodiments. A single policy control function is provided, in some embodiments, for all the profiles within one of multiple security domains. The policy control function embodiments are realized by creating a trust relationship between the profile provider and the eUICC credential holder. When an incoming command message arrives for a target profile, the ISD-R determines whether there is a pre-existing trust relationship between the provider of the target profile and the eUICC. If there is a pre-existing trust relationship, the ISD-R executes the command message for the target profile. The target profile applies rules determined by the policy control function for the profile. The rules may deny, permit, or alter the command before execution. In some embodiments, the ISD-P of the target profile executes the command message. A privilege assignment can be made to the ISD-P of the target profile before the ISD-P of the target profile executes the command, in some embodiments. In some embodiments, the privilege assignment is a GlobalPlatform secure domain privilege assignment.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
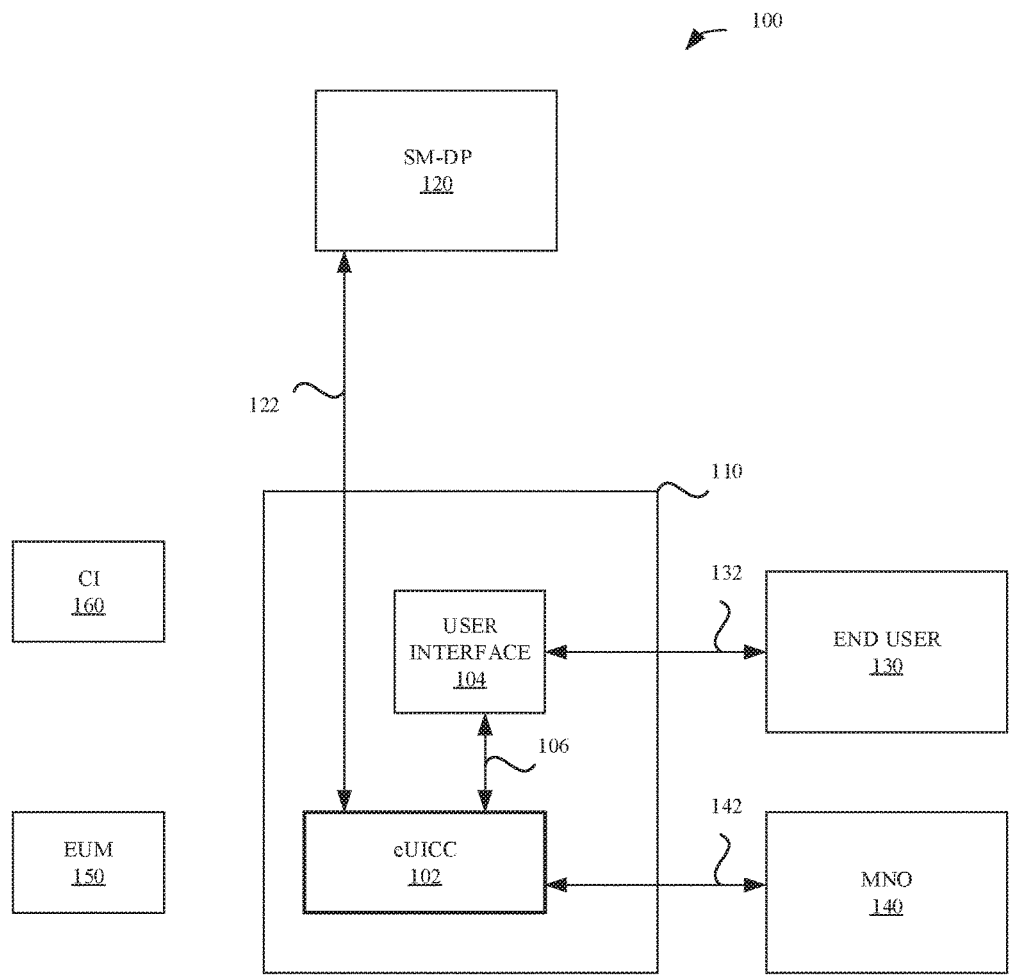
FIG. 1 illustrates an exemplary eUICC in a consumer device, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

End User Consent

Regulations can require end user consent when an MNO wishes to manage a profile within an end user's device. In some embodiments disclosed herein a message arriving at a device from a remote actor is first checked out by an end user using a user interface. After the end user confirms the message, the message is forwarded to an eUICC within the end user's device. Within the eUICC, an ISD-R authenticates the message using a key store. After successful authentication, the ISD-R directs the message to the profile addressed by the message. The end user consent problem is mitigated by presenting the user with the opportunity to veto processing of the message.

In some embodiments, a profile management command from the remote actor is processed at the ISD-R (or at the ISD-P of the profile addressed by the message) in the eUICC before end user confirmation is obtained. The ISD-R (or the ISD-P) causes an STK (SIM Toolkit) application to pop up a user interface dialog on the user interface to obtain end user confirmation. The device returns the end user confirmation to the eUICC and the ISD-R then directs the command to the proper profile within the eUICC.

Avoiding a Server Managing Someone Else's Profile

MNOs wish to avoid a malicious or faulty server associated with a different SM-DP attempting to manage a profile associated with the MNO. An ISD-R within an eUICC, in some embodiments, verifies the destination of the message and forwards it to the proper profile.

In some embodiments, a device has both a consumer or enterprise device characteristic. An eUICC hosts multiple profiles having different properties in some embodiments. The hosting is achieved by having a first security domain associated with a first credential, and a second security domain associated with a second credential. In some embodiments, a single security domain is used, and the first and second credentials are associated with different authorizations with regard to the multiple profiles. Key sets corresponding to the first and second credentials are stored in the ECASD of the eUICC. The key sets are public key infrastructure (PKI) public key-private key pairs in some embodiments. The key sets are pre-shared symmetric keys in some embodiments. Also, the first credential can correspond to a PKI key set and the second credential can correspond to pre-shared symmetric keys in some embodiments. One, two or more profiles can be accessible by a single credential, in either of the security domain configurations.

Approaches to Multiple Actors and the eUICC

In some exemplary embodiments, a given profile management operation can be performed using either of two different credentials. Platform-level concurrent management of a profile is thereby achieved. For example, a first profile management operation including a local management credential can be caused by a message initiated from the user interface on a device. The local management credential, in some embodiments, is biometric, a personal identification number (PIN), an embedded secure element (SE) certificate, or a pre-shared key. The same given management operation on the same profile, in some embodiments, can be performed by a remote actor using a message based on remote management credentials distinct from the local management credentials.

This single management operation feature is useful, for example, for the end user performing daily management on a given profile using the user interface and the local management credential. The same single management operation feature is useful, for example, for a manufacturer to perform repair or software operations.

In some machine-to-machine environment embodiments, a first profile in a first security domain is a machine-to-machine specific profile and a second profile in a second security domain is a consumer/enterprise profile (that is, provides services directly to an end user, a human being).

Alternatively, in some embodiments, a first profile in a first security domain is associated with enterprise (work/office) usage by a person and a second profile in a second security domain is associated with consumer (home/personal) usage by the person. In the enterprise usage scenario, an enterprise server message is authenticated for the first security domain by an ISD-R. The enterprise server installs and remotely manages the first profile. Also, in the eUICC in the same device, the second profile is installed and managed by an MNO and the person for consumer usage.

Commands in embodiments described herein reach the multiple, mixed profile type eUICC described herein by wireless means or by the end user directly using a user interface. The device in which the eUICC was inserted at manufacture, in some embodiments, is a machine-to-machine device which is remotely managed and does not include a user interface. Alternatively, the device may be a consumer device with a user interface. An end user can locally manage the device using the user interface. The end user can also remotely manage a consumer device or machine-to-machine device via the Internet or an Internet cloud. In the remote management scenario, the device being managed can be connected to the Internet via a wireless base station.

Concurrent Management of Profiles

Concurrent profile management of a first and second profile means that a party holding credentials sufficient to perform profile management functions on the first profile is also capable of performing the same type of profile management functions on the second profile. For example, an end user can initiate profile management commands for each of the first and second profile using the same credential.

Policy Control Function in a Profile

A policy control function ("PCF") can be configured within each profile. A first and second profile can be accessed with a first credential, and a third and fourth profile can be accessed with a second credential. A first profile provider (SM-DP), in some embodiments, pre-arranges trust with the eUICC credential holder (e.g., the certificate issuer). The eUICC is then aware that the first SM-DP is trustworthy. This awareness or alert creates a secure tie or association between the eUICC and the first SM-DP with regard to the first and second profiles. In some embodiments, the ISD-R recognizes an incoming message as originating with the first SM-DP having pre-arranged trust with the eUICC. The ISD-R can generate a message carrying a profile management command of the incoming message to, for example, the first profile. The first profile invokes a first PCF to determine how to act on the profile management command. If the rules within the PCF permit it, then the first profile processes the profile management command to carry it out. Alternatively, the rules can modify the command before execution, or reject the command entirely.

The third and fourth profiles, in some embodiments, are associated with a second SM-DP associated with the second credential. A message, for example, from the first SM-DP to an eUICC invoking the pre-arranged trust relationship of the first SM-DP is not forwarded by the ISD-R to the third or fourth profiles because of the lack of a secure tie or association between the first SM-DP and the eUICC with regard to the third and fourth profiles. The second SM-DP is in possession of the second credential and has a second pre-arranged trust relationship with the eUICC with regard to the third and fourth profiles. A message from the second SM-DP, for example, to the third profile in the eUICC would reach the corresponding third PCF for rule checking and execution if permitted by the rules of the third PCF.

Embodiments will now be described with regard to the figures.

eUICC in a Consumer Device

FIG. 1 illustrates an exemplary system for provisioning eUICC 102 in a system 100. During assembly of a device 110, the eUICC 102 is inserted into the device 110 by an eUICC manufacturer, EUM 150. The device 110 includes a user interface 104. The user interface 104 may include a keypad and display screen, for example. The user interface 104 is for use by an end user 130. An MNO 140 can provide services to the end user 130. An SM-DP provides profile packages to eUICC 102. The SM-DP communicates over an interface 122 with eUICC 102. Certificates used for authentication and confidentiality purposes in the system 100 can be generated by a trusted certificate issuer, CI 160. Further description of certification chains used for authentication of parties attempting to communicate can be found in SGP.02.

Figure 2:
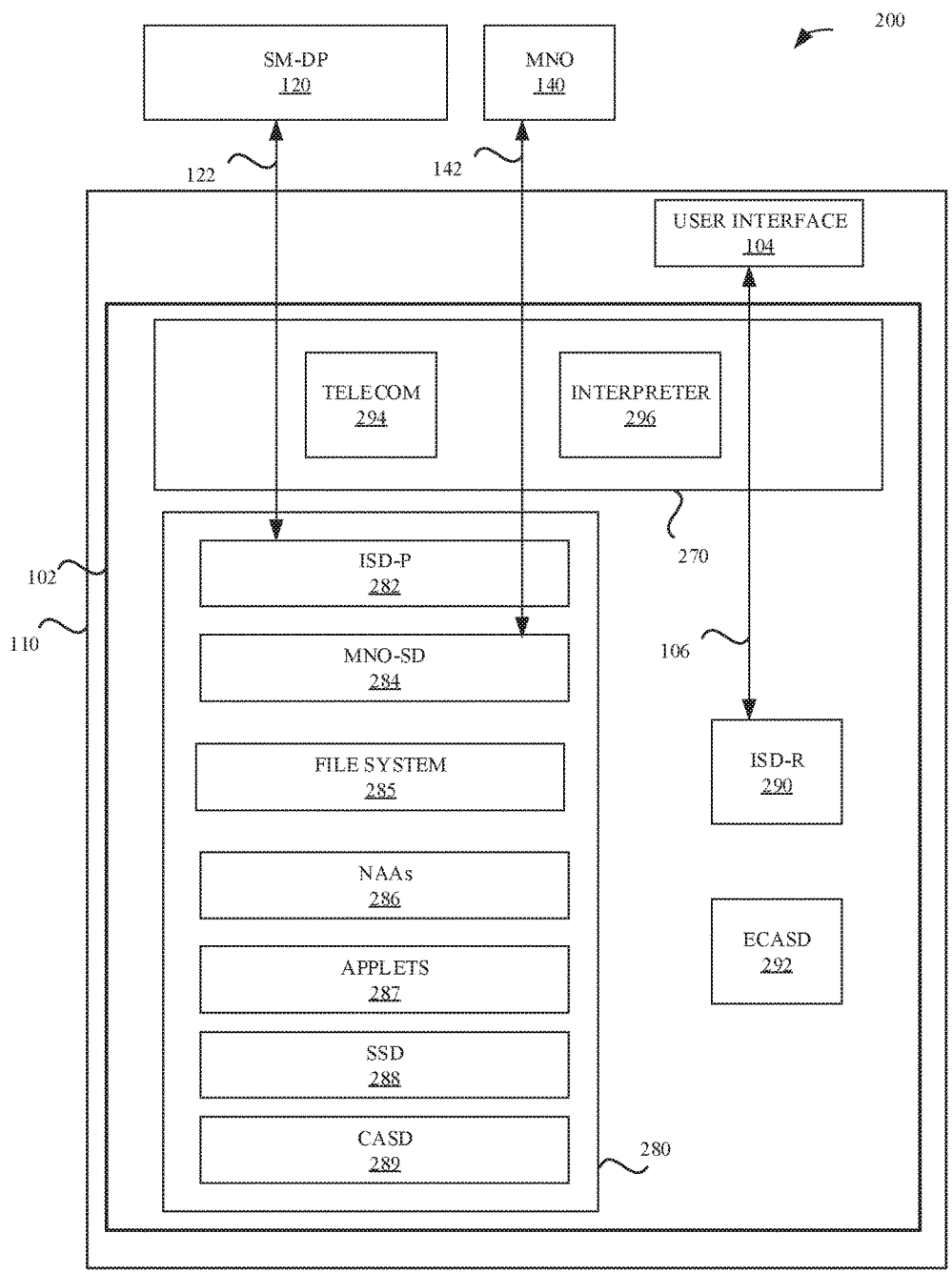
FIG. 2 illustrates exemplary details of the eUICC of FIG. 1, according to some embodiments.

FIG. 2 illustrates further details of the eUICC 102 in a system 200. The eUICC 102 includes an operating system 270. Within the operating system 270 is a telecom framework 294 which provides authentication algorithms to network access applications (such as NAAs 286). Interpreter 296 translates profile package data into an installed profile using a specific internal format of the eUICC 102. ISD-P 282 hosts a profile 280. The ISD-P is a secure container (security domain) for the hosting of the profile 280. The ISD-P is used for profile download and installation in collaboration with the interpreter 296 for the decoding of a received bound profile package. ISD-R 290 is responsible for the creation of new ISD-Ps on the eUICC 102 and the lifecycle management of all ISD-Ps on the eUICC 102. ECASD 292 provides secure storage of credentials required to support the security domains on eUICC 102. MNO-SD 284 is the representative on the eUICC 102 of the operator providing services to the end user 130. The MNO-SD 284 contains the operator's OTA keys and provides a secure OTA channel. Further description of profile management in a consumer device can be found in SGP.21.

eUICC in a Machine-to-Machine Environment

Figure 3:
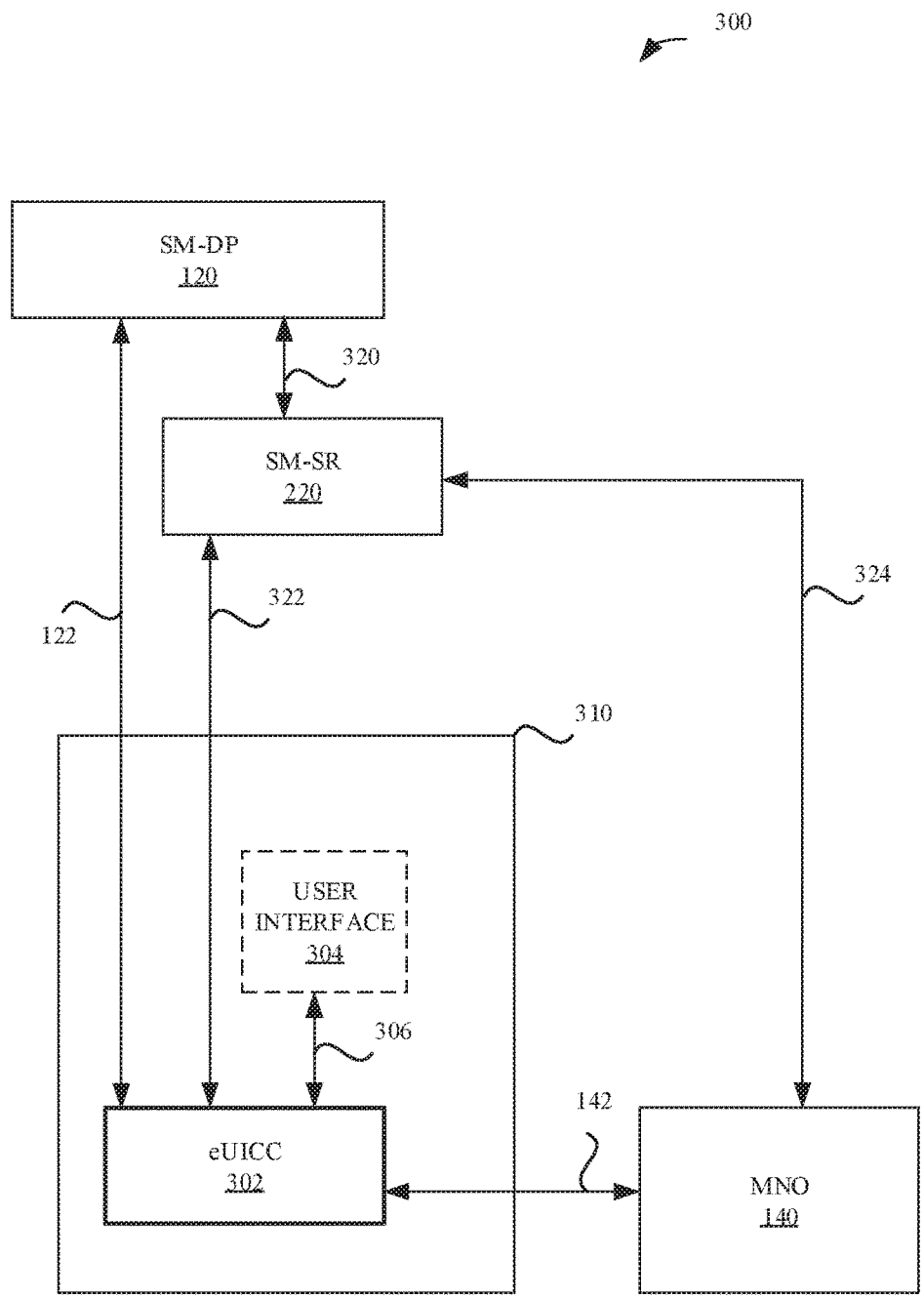
FIG. 3 illustrates an exemplary eUICC in a machine-to-machine environment, according to some embodiments.

FIG. 3 illustrates an exemplary system 300 for provisioning an eUICC 302 in a machine-to-machine environment. Some profile management operations are carried out through SM-SR 220. SM-DP 120 communicates with the eUICC 302 directly through interface 122 or through the SM-SR 220 via interfaces 320 and 322. The MNO 140 communicates with the eUICC 302 directly through interface 142 or through the SM-SR 220 via interfaces 324 and 322. In a typical machine-to-machine environment, there is no end user. The eUICC 302 illustrates a user interface 304 with a dashed outline to indicate that the user interface 304 is optional. Further description of secure message passing between the SM-DP 120, the SM-SR 220, the MNO 140 and the eUICC 302 can be found in SGP.02.

Figure 4:
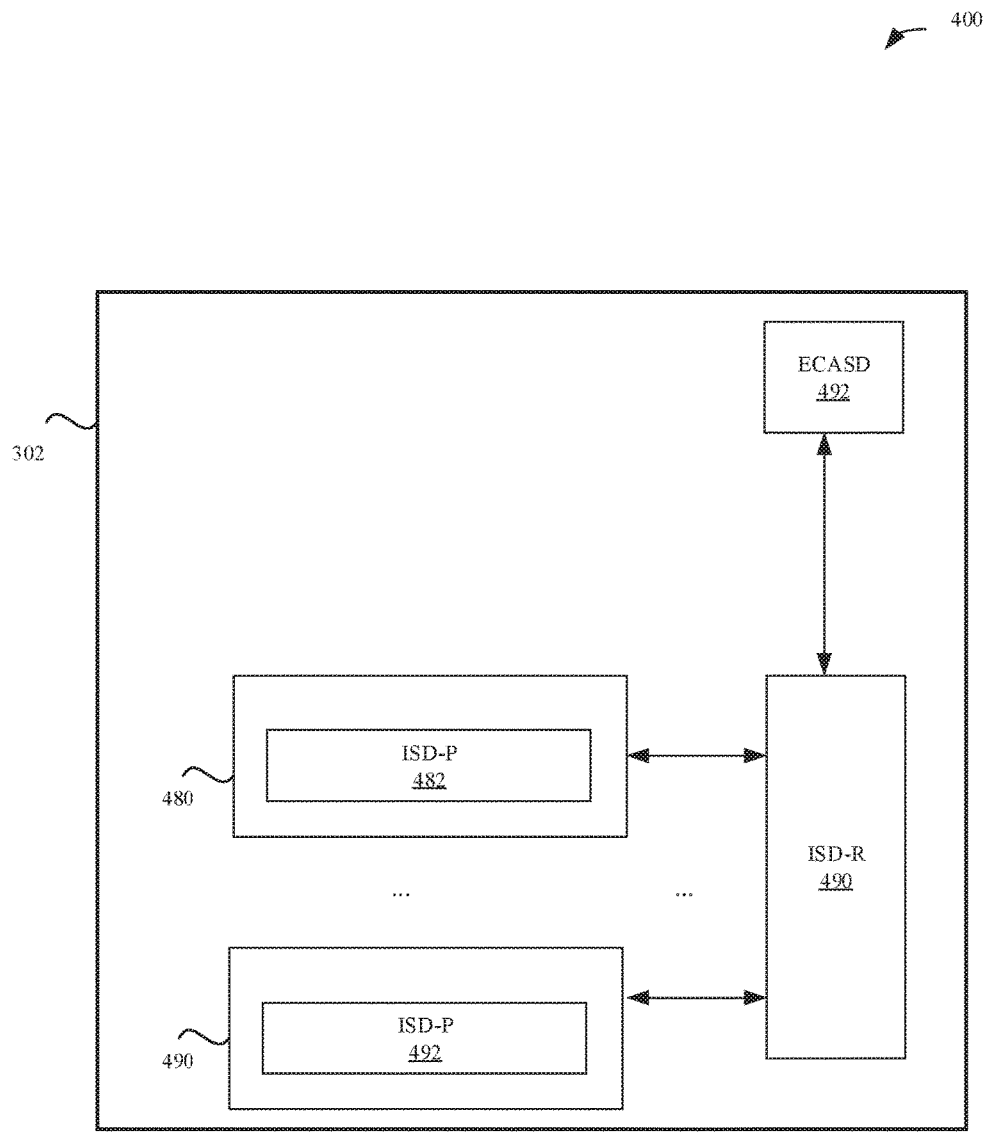
FIG. 4 illustrates exemplary details of the eUICC of FIG. 3, according to some embodiments.

FIG. 4 illustrates the exemplary eUICC 302 as a system 400 comprising several security domains for the purpose of profile management. ISD-R 490 is the representative of the SM-SR 220. The ECASD 492 is the representative of the CI 160. ISD-P 482 within profile 480 is the representative of SM-DP 120. The ECASD 492 is involved in SM-DP key set establishment for profile download and installation. The ECASD is personalized by EUM 150 with a PKI public key-private key pair and an EID (eUICC identifier) during manufacture of eUICC 302. The eUICC 302 can include one, two, or more profiles. FIG. 4 illustrates exemplary profiles 480 and 490. Further description of profile management in a machine-to-machine environment device can be found in SGP.02.

Remote and Local Management for Consumer/Enterprise/M2M Devices

As mentioned above, challenges with profile management on eUICCs in consumer/enterprise devices and in MSM devices include: i) lack of end user consent when an MNO may wish to manage a profile within an end user's device, ii) an MNO requirement that only their contracted SM-DP having an ability to perform profile management on a profile associated with the MNO, and iii) a need to have machine-to-machine profiles and consumer or enterprise profiles share the same eUICC.

Figure 5:
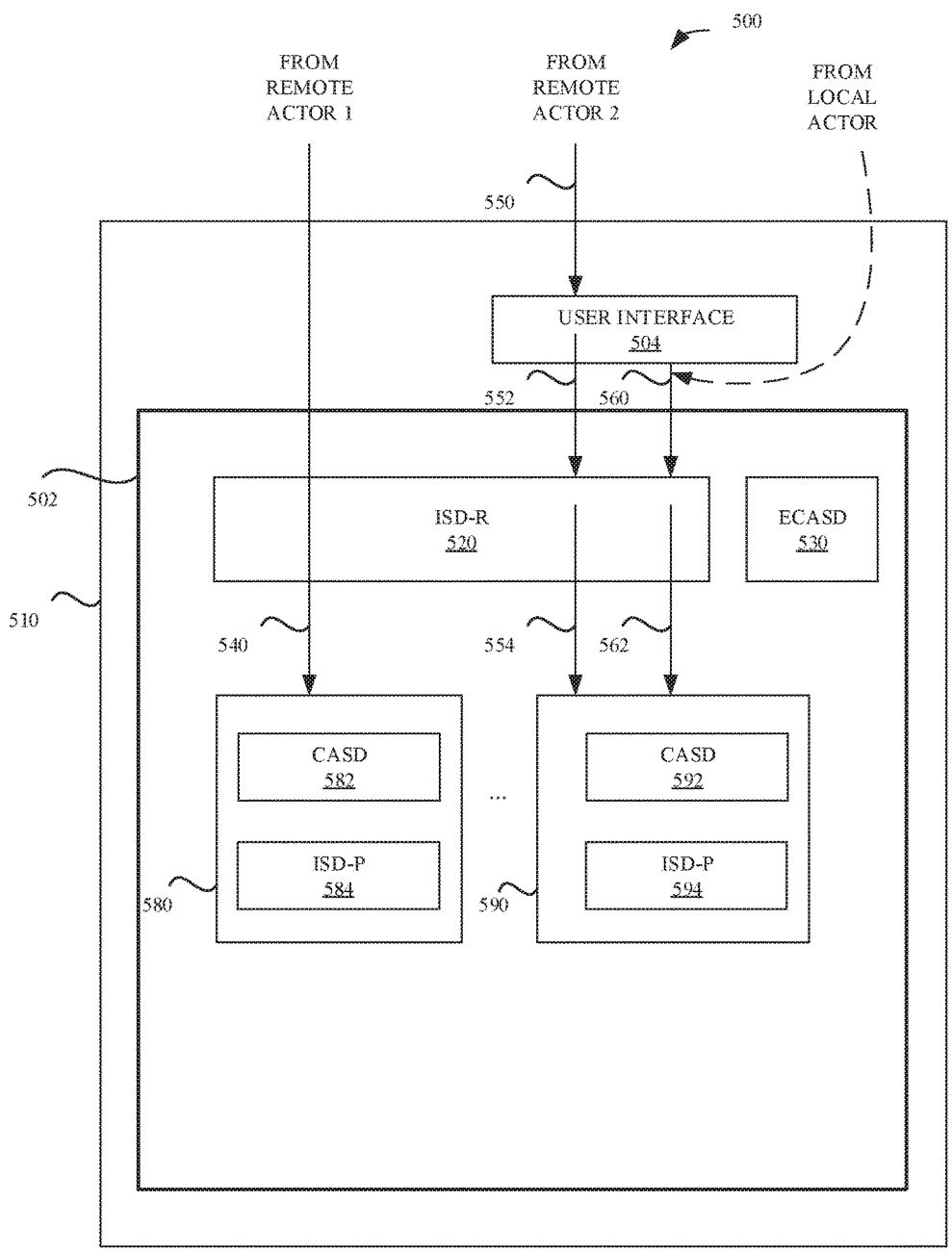
FIG. 5 illustrates an exemplary embodiment of an eUICC useful in both consumer/enterprise and machine-to-machine environments, according to some embodiments.

FIG. 5 provides an exemplary eUICC 502 as a system 500 useful for improving performance with regard to these challenges. For example, a message 550 arriving at a device 510 from a remote actor 2 is first checked out by the end user 130 using user interface 504. After the end user 130 confirms the message, the message is forwarded as indicated as message 552 to ISD-R 520. Further on in this description, FIG. 8 will be described which provides logic associated with the message 550/552 sequence. Also, FIG. 10 Event 1 involving a user inquiry 11 is also exemplary message flow related to message 550. The ISD-R 520 authenticates, using key store ECASD 530, the credentials associated with the message 550 and then directs it to profile 590 as shown by message 554. Thus, consent of the end user 130 is obtained by presenting the end user 130 with the opportunity to veto processing of the message. The MNO requirement seeks to avoid a malicious or faulty server associated with a different SM-DP managing profiles without authority. This MNO requirement is served by ISD-R 520 verifying the destination of the message and forwarding it to profile 590, and not, for example, allowing the message sequence 550/552 to reach profile 580. In some embodiments, a profile management command from the remote actor 2 is processed at the ISD-R 520 before end user confirmation is obtained. The ISD-R 520 causes an STK application to pop up a user interface dialog on the user interface 504 to obtain user confirmation. Please see FIG. 9 for logic associated with this message sequence and related FIG. 10 Event 2 for an exemplary message flow involving a user inquiry 23.

The eUICC 502 is a superset of the eUICC 102 and the eUICC 302 with additional features and functions.

FIG. 5 illustrates that, in some exemplary embodiments, a single profile management operation can be performed using either of two different credentials. Platform-level concurrent management of a profile is thereby achieved. For example, a first profile management operation can be caused by the message 560 initiated from the user interface 504. The local management credential may be biometric (such as a finger print reader proving the identity of end user 130 using user interface 504), personal identification number (PIN) entry by the end user 130, an embedded secure element (SE) certificate or a pre-shared key. The same first management operation on profile 590, in some embodiments, can be performed by remote actor 2 using a message 550 based on remote management credentials. The remote management credentials can be based on a PKI certificate associated with a PKI public key private key pair of the remote actor 2 or based on pre-shared keys. In this embodiment, an end user inquiry via user interface 504 may be performed. Alternatively the management command by the remote actor 2 bypasses the user interface 504 and is authenticated directly at the ISD-R 520 using the key store ECASD 530 before reaching profile 590. Alternatively, the command message from the remote actor 2 is tunneled directly to profile 590 and authenticated using the key store CASD 592 (similar to how the message 540 from the remote actor 1 is tunneled directly to the profile 580 and authenticated using the key store CASD 582). This single management operation feature is useful, for example, for the end user 130 performing daily management on profile 590 using the user interface 504 and the local management credential. The same single management operation feature is useful, for example, for a manufacturer to perform repair or software operations. For example, the manufacturer may manage the device 510 to update software associated with profile 590, such as applets 287, file system 285 or NAAs 286 (see FIG. 2). The manufacturer may also reset a state of the profile 590 using remote management. The manufacturer may switch from a provisional or bootstrap profile to the profile 590 to enable a variety of network services such as voice, data, and roaming. In some embodiments, the manufacturer may use remote management credentials and send a remote management command to reset the user interface 504 in a repair operation. Such a repair command, in some embodiments, bypasses the user interface 504 and is authenticated and interpreted at the ISD-R 520 to provide a repair or reset command to the user interface 504 or to the device 510.

FIG. 5 illustrates two additional profile management techniques supported by the eUICC 502 in some embodiments. First, a local actor with proper credentials can manage the profile 590 by causing message 560 which is verified by the ISD-R 520 using the key store ECASD 530 before generating a command 562. An additional technique is illustrated in which a profile command message 540 is tunneled by a remote actor 1 through to profile 580. Profile 580 possesses key store CASD 582 and ISD-P 584. ISD-P 584 can authenticate the profile management command arriving as the message 540 using the credentials stored in the key store CASD 582.

Figure 6:
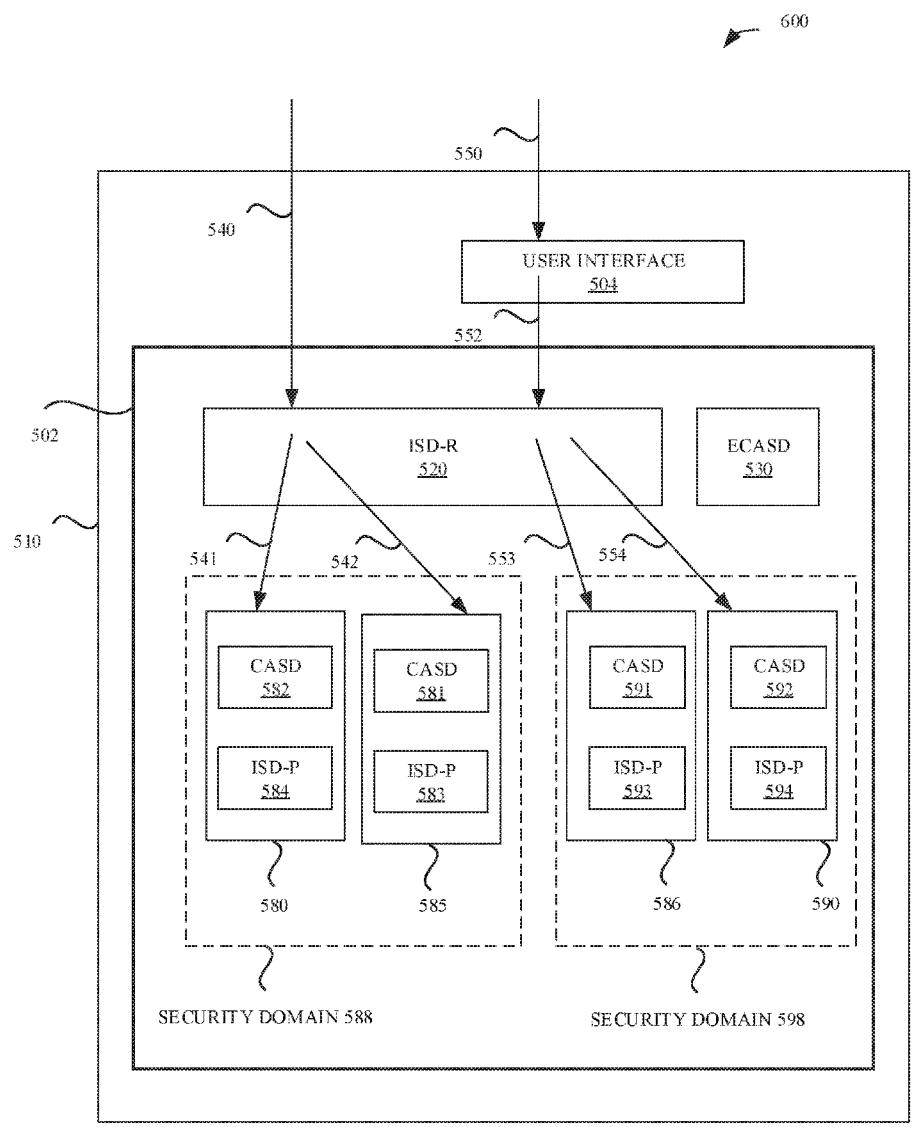
FIG. 6 illustrates an exemplary eUICC in which two or more profiles are managed within a security domain corresponding to a credential, according to some embodiments.

FIG. 6 illustrates exemplary profile management techniques designed to mitigate the concern of a given MNO that a wrong SM-DP could cause a profile management action to be carried out on a profile associated with the given MNO. In some embodiments, device 510 of FIG. 6 has both a consumer or enterprise device characteristic as evidenced by the presence of user interface 504 and a machine-to-machine aspect. Therefore, FIG. 6 illustrates an exemplary realization 600 of the eUICC 502 in the device 510 with multiple profiles having different properties. FIG. 6 illustrates a first security domain 588 associated with a first credential, and a second security domain 598 associated with a second credential different than the first credential. Key sets corresponding to the first and second credentials are stored in the ECASD 530. The key sets are PKI public key-private key pairs in some embodiments. The key sets are pre-shared symmetric keys in some embodiments. Also, the first credential can correspond to a PKI key set and the second credential can correspond to pre-shared symmetric keys in some embodiments.

In some machine-to-machine environment embodiments, the profile 580 in the security domain 588 is a machine-to-machine specific profile and the profile 586 in the security domain 598 is an MNO profile for consumer/enterprise services.

Alternatively, in some embodiments, the profile 580 and a profile 585 are associated with enterprise (work/office) usage by a person and the profile 586 and a profile 590 are associated with consumer (home/personal) usage by the person. In the enterprise usage scenario, an enterprise server message, for example message 540, is authenticated for the security domain 588 by the ISD-R 520. The enterprise server (not shown) installs and remotely manages the profiles 580 and 585. Also in the eUICC 502 in the device 510, the profiles 586 and 590 are installed and managed for consumer usage by an MNO and the person.

The profile installation and management actions in these machine-to-machine, enterprise, and consumer embodiments are, in some embodiments, carried out based on the messages 540 and 550 as shown in FIGS. 5 and 6. The profile installation and management actions in these machine-to-machine, enterprise, and consumer embodiments are, in some embodiments, carried out in whole or in part using messages such as message 560 of FIG. 5. For example, an SM-DP associated with an enterprise environment can use a message sequence initiated by the message 540 or the message 550. An SM-DP associated with a machine-to-machine environment can use a message sequence initiated with the message 540. Some machine-to-machine environments can use message sequences involving a user interface 504 and so message 550 is used in a machine-to-machine environment in some embodiments. Finally, a user may manage their device 510 either locally (message 560) or remotely (message 540), for example, through the Internet cloud.

Figure 7:
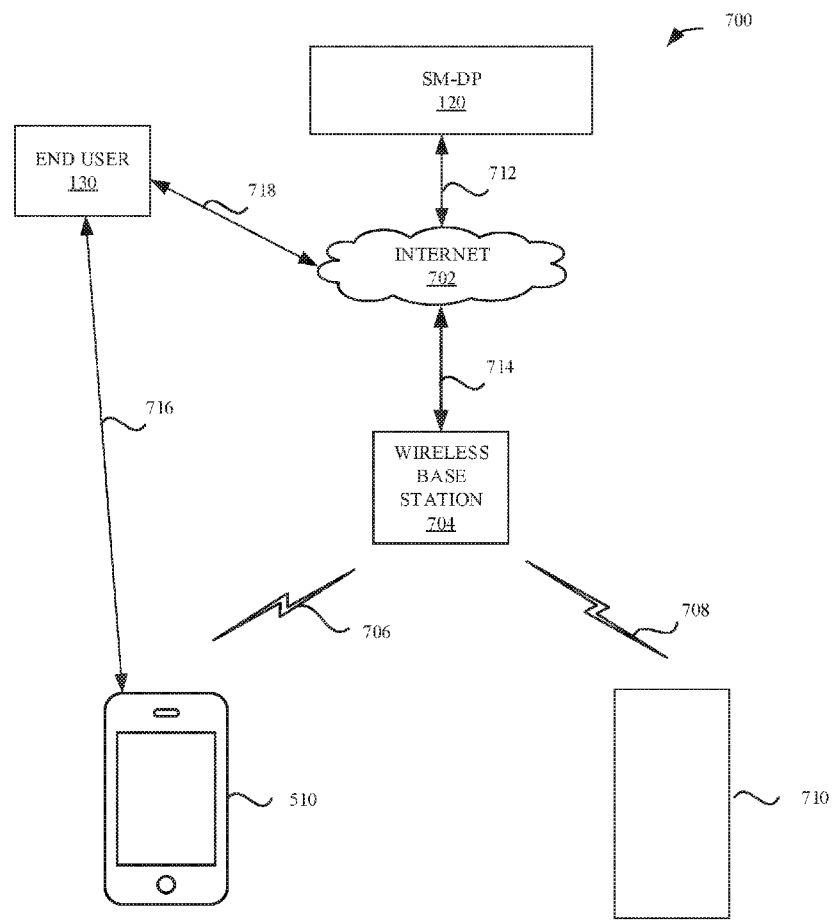
FIG. 7 illustrates an exemplary system in which devices having properties of FIG. 5 or FIG. 6 are remotely managed by an end user or by an SM-DP, according to some embodiments. The end user can also manage a device locally.

FIG. 7 illustrates example connection methods for remote and local management of the device 510 and of a device 710 in a system 700. Device 710 is an example of a machine-to-machine device which is remotely managed and does not include a user interface. Device 710, in some embodiments, includes profile and other components similar to the device 510 and can be managed as described herein with regard to the device 510 in FIGS. 5-6. End user 130 can locally manage device 510 using interface 716 which can represent end user actions such as those described with regard to FIGS. 5-6 and actions to be described with the aid of FIGS. 8-12. The end user 130 can also remotely manage device 510 or device 710 via the Internet 702 using interface 718. The device 510 and the device 710 are shown connected to a wireless base station 704. The wireless base station 704 communicates with the device 510 via a wireless link 706 and with the device 710 via a wireless link 708. The wireless base station 704 can be an Institute of Electronic and Electrical Engineers 802.11 Wireless Fidelity (IEEE 802.11 WiFi) access point (AP) or the wireless base station 704 can be, for example, a cellular mobile network base station. Examples of cellular mobile network base stations are a 2G or 3G base station or an LTE eNode B. The SM-DP 120 can connect to the device 510 or the device 710 via the Internet to perform profile management operations such as those discussed in FIGS. 5-6 and FIGS. 8-12.

Figure 8:
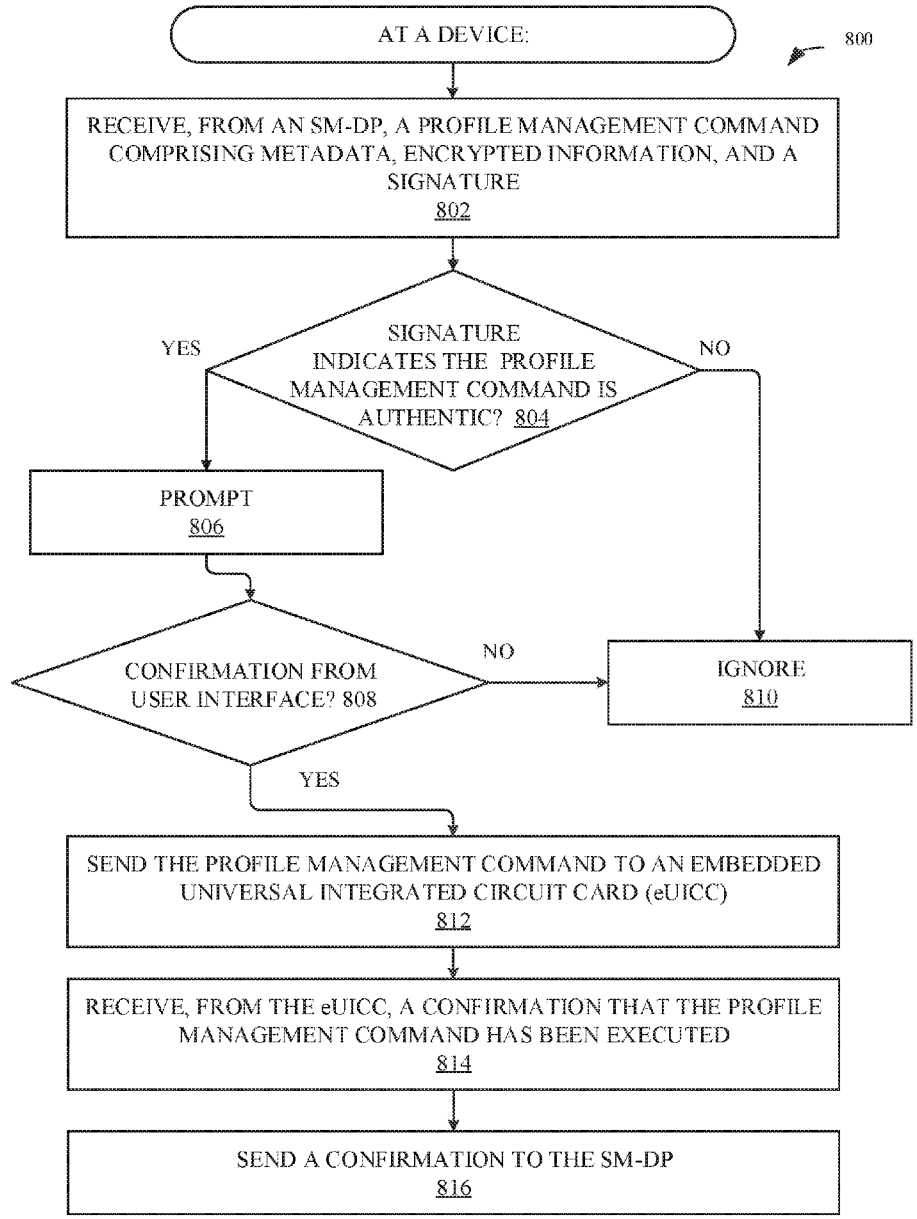
FIG. 8 illustrates exemplary logic for a device receiving a command comprising metadata, according to some embodiments.
Figure 10:
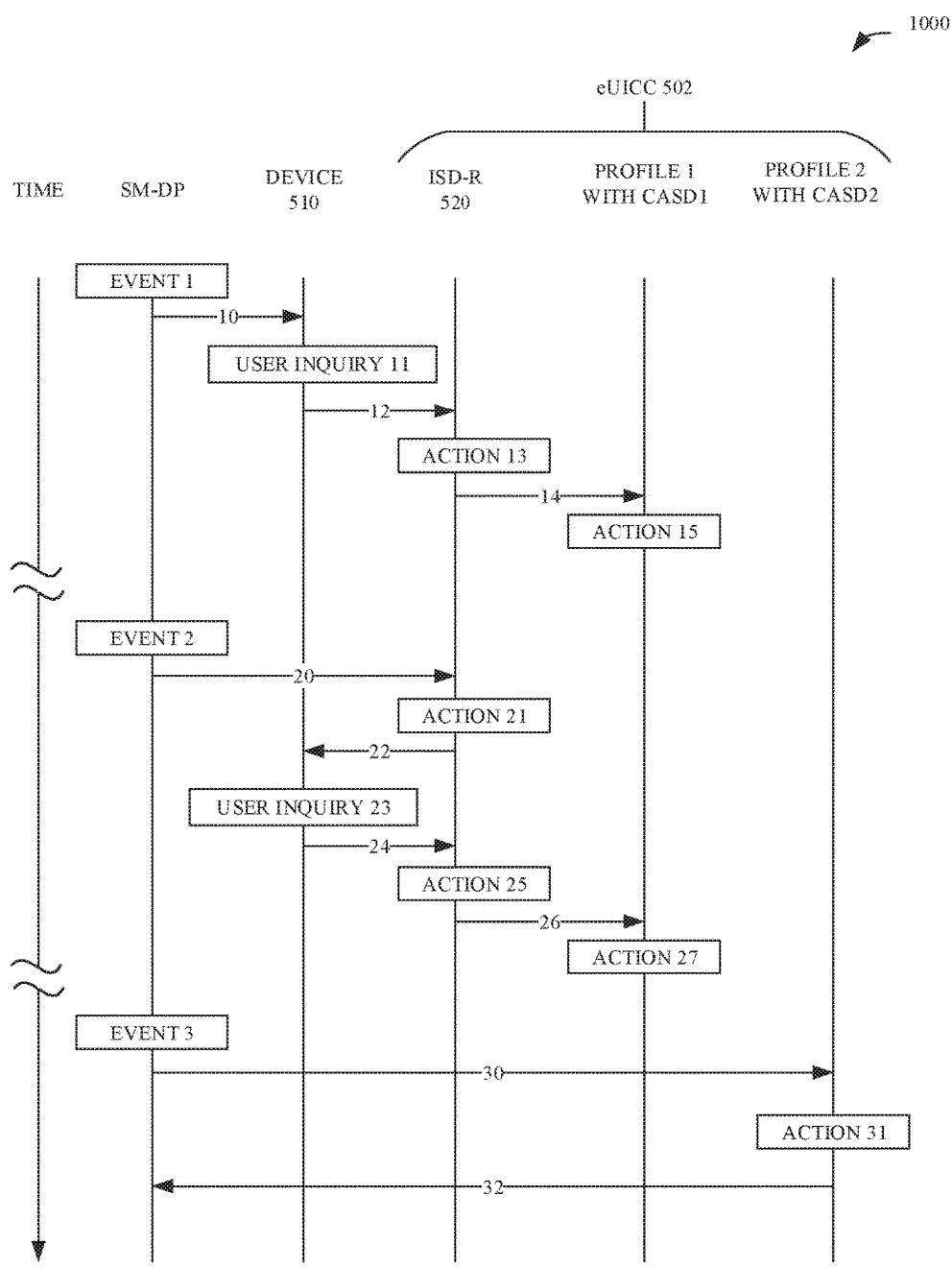
FIG. 10 illustrates exemplary message flows for local and remote profile management of profiles within an eUICC, according to some embodiments. The message flows of FIG. 10 carry out the logic of FIGS. 8 and 9, according to some embodiments.

FIG. 8 comprises exemplary logic 800 for remote profile management including a first exemplary method for obtaining consent of an end user. At 802, a device receives a profile management command from an SM-DP. The profile management command comprises metadata, encrypted data and a signature. At 804, the device evaluates the signature. If the signature is authentic, the logic flows to 806. If the signature is not authentic, the profile management command is ignored as shown by 810. At 806, the device creates a prompt at a user interface that prompts the end user to confirm the profile management command. The prompt is based on the metadata received in the profile management command. If the user confirms the profile management command at 808, a confirmation is received from the user interface, and the logic flows to 812. If the user does not confirm the profile management command and thus no confirmation is received from the user interface, the profile management command is ignored. At 812, the profile management command is sent to the eUICC in the device. The eUICC will verify that the profile management command from the SM-DP is authorized for the type of command and for the profile which is targeted by the command. The profile management command is then processed. The eUICC provides a confirmation of processing at 814 which the device receives. The device then sends a confirmation to the SM-DP at 816 based on the confirmation received from the eUICC. The logic flow of FIG. 8 is exemplary of the message sequence 550 and 552 of FIG. 5 and Event 1 and user inquiry 11 of FIG. 10. FIGS. 5 and 10 do not show the eUICC confirmation message corresponding to 814 and 816 of FIG. 8.

Figure 9:
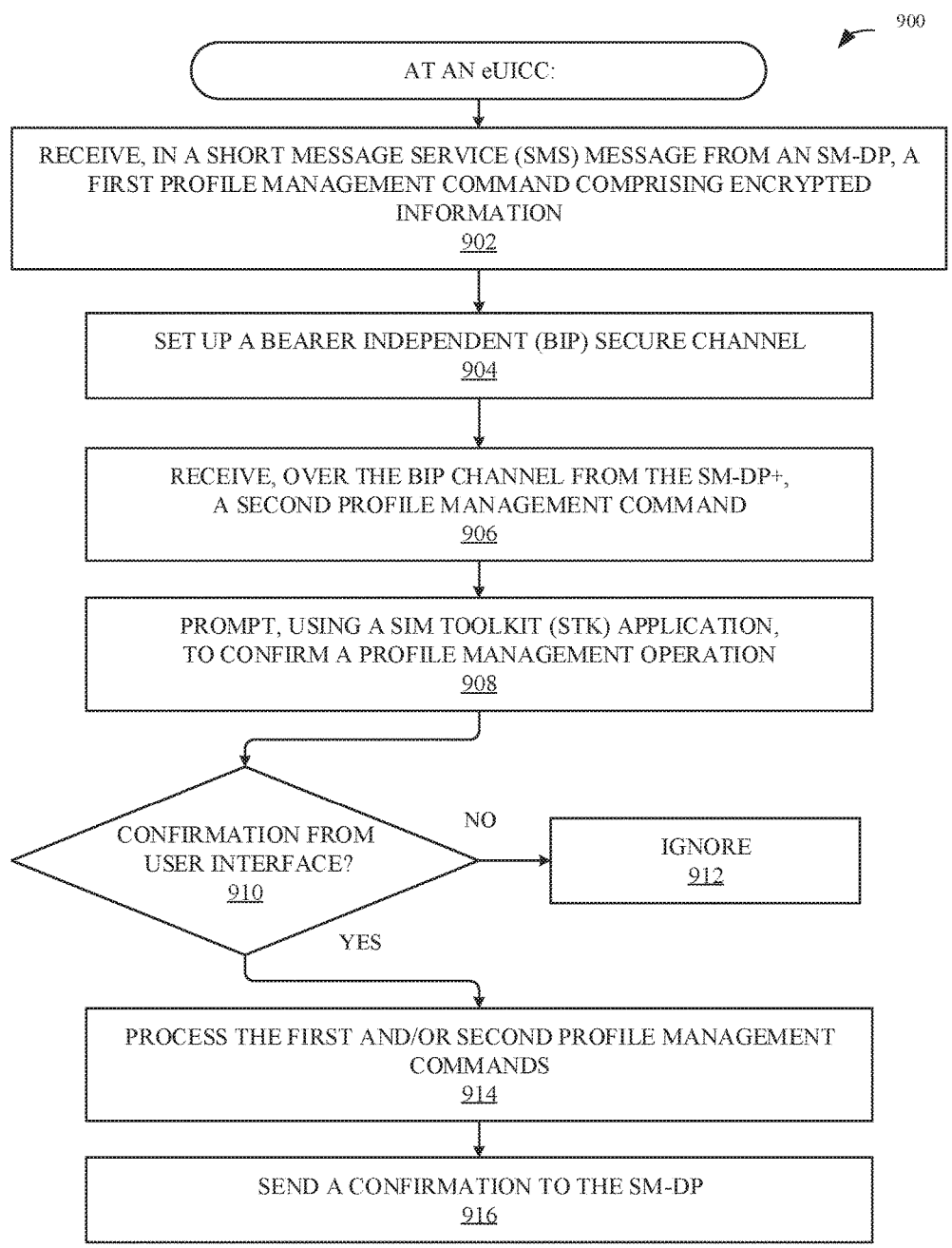
FIG. 9 illustrates exemplary logic for an eUICC confirming a command with an end user, according to some embodiments.

FIG. 9 comprises exemplary logic 900 for remote profile management including a second exemplary method for verifying consent of an end user. At 902, an eUICC receives a first profile management command via short message service (SMS) from an SM-DP. The profile management command comprises encrypted and/or integrity-protected information. The encrypted and/or integrity protected information can include encrypted data. At 904, the eUICC can optionally set up a bearer independent (BIP) channel. In some embodiments, the first profile management command is a handshake command which is authenticated by the eUICC and then causes the eUICC to set up the BIP channel. When a BIP channel has been set up, the eUICC can receive a second profile management command at 906 over the BIP channel. At 908, the device, based on the first and/or second profile management command, prompts the end user to confirm a profile management operation based on the first and/or second profile management command. The prompt is provided on a user interface. In some embodiments, the prompt is based on an STK application triggered by the eUICC. The STK application pops up a graphic user interface (GUI) on the user interface. If the end user confirms the profile management operation at 910, a confirmation is received from the user interface, and the logic flows to 914. If the user does not confirm the profile management operation, then no confirmation is received from the user interface, and the second exemplary method terminates at 912 without affecting the eUICC data. At 914, the profile management operation based on the first and/or second profile management command is processed by the eUICC. The eUICC provides a confirmation of processing to the SM-DP at 916. The logic flow of FIG. 9 is exemplary of Event 2 and user inquiry 23 of FIG. 10. FIG. 10 does not show the eUICC confirmation message corresponding to 916 of FIG. 9.

FIG. 10 illustrates an exemplary embodiment 1000 of profile-level remote profile management authorization. A vertical time axis is shown on the left. Time advances from top to bottom. Indefinite breaks in time between events are shown on the time axis with a pair of short wavy lines. The actors or roles involved are shown across the top of FIG. 10. Three profile management events initiated by an SM-DP are shown ordered in time in FIG. 10: Event 1, Event 2, and Event 3. The FIG. 10 sequence Event 1 through Action 13 corresponds to a portion of the logic of FIG. 8. The arrow annotated with the numeral 10 is referred to as message 10, and likewise for other such arrows. Message 10 is a profile management command comprising command metadata, an encrypted command and/or data and a security signature.

User Inquiry 11 represents the device 510 presenting to the end user 130 a prompt asking if the message 10 should be processed. In FIG. 10, the end user 130 has confirmed and message 12 comprising the information of message 10 or a subset of the information of message 10 passes to the ISD-R 520 of eUICC 502. Action 13 includes the ISD-R 520 checking security and authorization. If the ISD-R is able to authenticate message 12 and the SM-DP has proper authorization to perform the commanded profile management command, then message 14 is sent, for example, to a profile 1. Profile 1 of FIG. 10 includes key store CASD1 which includes information on what actors belong to a trusted chain for profile management of profile 1. Profile 1 evaluates message 14, and if the information in key store CASD1 indicates that message 14 is authentic and authorized, then profile 1 carries out the profile management command of message 14 at Action 15. Action 15, in some embodiments, is executed whether or not profile 1 is activated. For example, even if profile 1 is not selectable by the end user 130 over the user interface 504 or activated for machine-to-machine device operation, the profile management of action 15 is still carried out. An example of message 14 and of profile 1 of FIG. 10 is message 554 and profile 590 of FIG. 5.

Event 2 through Action 27 of FIG. 10 illustrates profile-level remote profile management authorization in which a confirmation from a user interface is obtained by the eUICC 502. At Event 2, an SM-DP sends a message 20 to the eUICC 502. At 21, the eUICC 502 determines that consent of the end user 130 is required and sends message 22 to the device 510. The device 510 prompts the end user 130 at User Inquiry 23. Based on a confirmation received from the user interface, the device 510 sends message 24 back to the eUICC 502. Action 25, message 26 and Action 27 have the same functions and features as the Event 1 triggered sequence of Action 13, message 14 and Action 15.

Event 3, message 30, Action 31 and message 32 of FIG. 10 illustrate profile-level remote profile management authorization in which the consent of the end user is not obtained.

Figure 11:
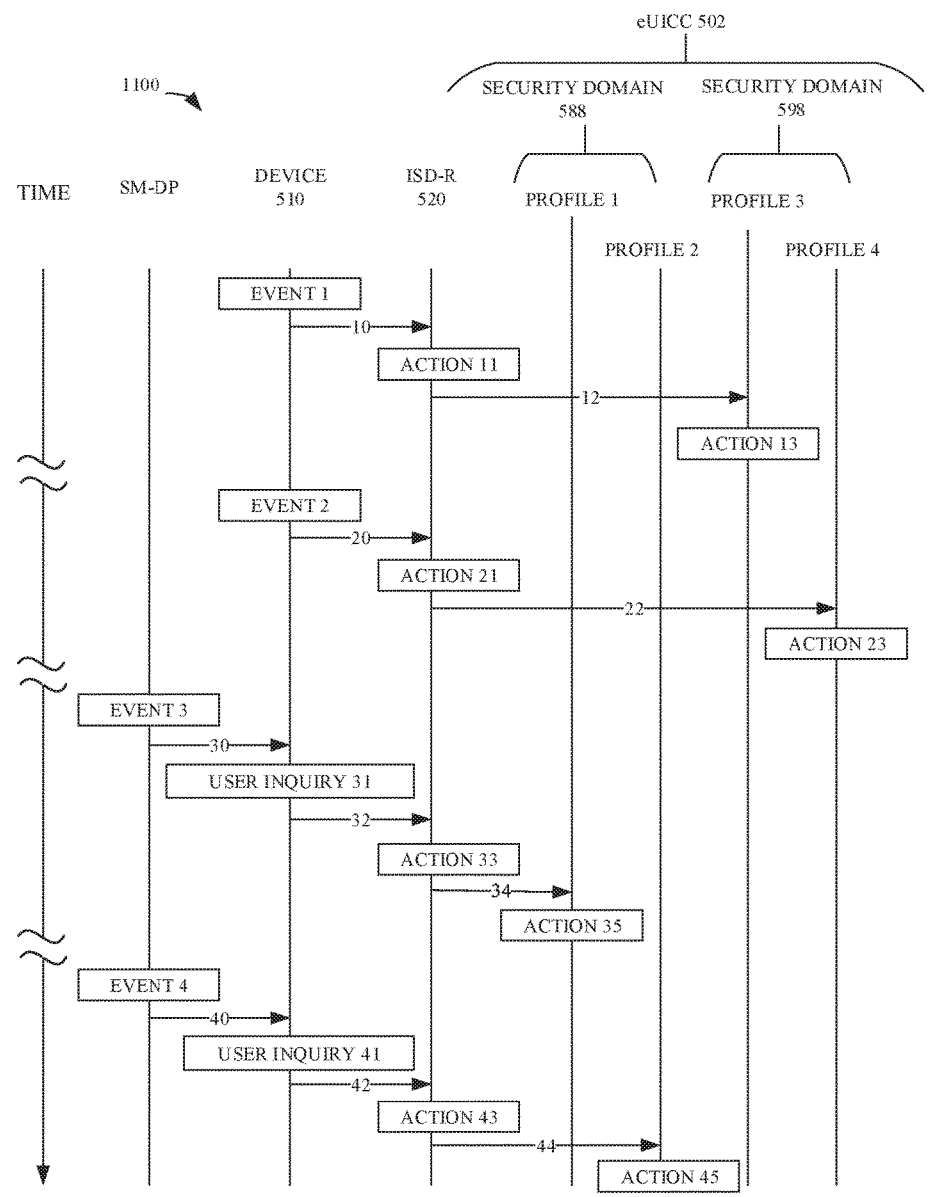
FIG. 11 illustrates exemplary message flows for remote profile management of profiles within an eUICC, according to some embodiments. Two profiles are within a same security domain in some embodiments.

FIG. 11 illustrates message flows of profile-level concurrent management of FIG. 6, particularly security domain 588 comprising a profile 1 and a profile 2 and security domain 598 comprising a profile 3 and a profile 4. Security domains 588 and 598 are within the eUICC 502. Examples of profiles 3 and 4 of FIG. 11 are profiles 586 and 590 of FIG. 6. Concurrent profile management of profiles 3 and 4 means that a party holding credentials sufficient to perform profile management functions on profile 3 is also capable of performing the same type of profile management functions on profile 4. Events 1 and 2 of FIG. 11 correspond to an end user initiating profile management commands for each of profiles 3 and 4 using the same credentials, however at different times. Event 1 by the end user 130 leads to message 10 and the ISD-R 520 checks the associated credentials of the end user 130 indicated by message 10. If message 10 indicates that the end user 130 has authority to act in security domain 598, message 12 is generated by the ISD-R 520 and sent to profile 3 of the eUICC 502. In Action 13, profile 3 then carries out the indicated profile management command indicated by message 12. Event 2, message 20, Actions 21, message 22, and Action 23 flowing between the end user 130 and profile 4 correspond to the Event 1 through Action 13 sequence from the end user 130 to profile 3. In some embodiments, profiles 3 and 4 correspond to two profiles associated with consumer (home/personal) usage by a person and profiles 1 and 2 correspond to two profiles associated with enterprise (work/office) usage by the person.

Events 3 and 4 of FIG. 11 originate at an SM-DP. As mentioned above, profiles 1 and 2 in security domain 588, in some embodiments, correspond to enterprise usage. User Inquiries 31 and 41 occur as in item 806 of FIG. 8 to obtain confirmation from a user interface (or alternatively with eUICC-caused STK involvement as in item 910 of FIG. 9). Also, access to security domain 588 may be achieved as with message 540 of FIG. 5, that is, with secure tunneling directly to eUICC 502 without a user consent confirmation. In summary, the related message flows are as follows. Event 3 leads to message 30. User Inquiry 31 (optional) obtains user consent and a message 32 is sent to the eUICC 502. In the eUICC 502, the ISD-R 520 checks the credential associated with message 32. The ISD-R 520 determines that the profile management command associated with the message 32 is authorized and authentic. The ISD-R 520 then commands profile 1 with message 34 and profile 1 carries out the management action as Action 35. The same credential is used starting with Event 4 to achieve Action 45 in profile 2, because profiles 1 and 2 are in the same security domain 588 within the eUICC 502. Message 40 is analogous to message 30, User Inquiry 41 is analogous to User Inquiry 31, message 42 is analogous to message 32, Action 43 is analogous to Action 33, message 44 is analogous to message 34, and Action 45 is analogous to Action 35.

Figure 12:
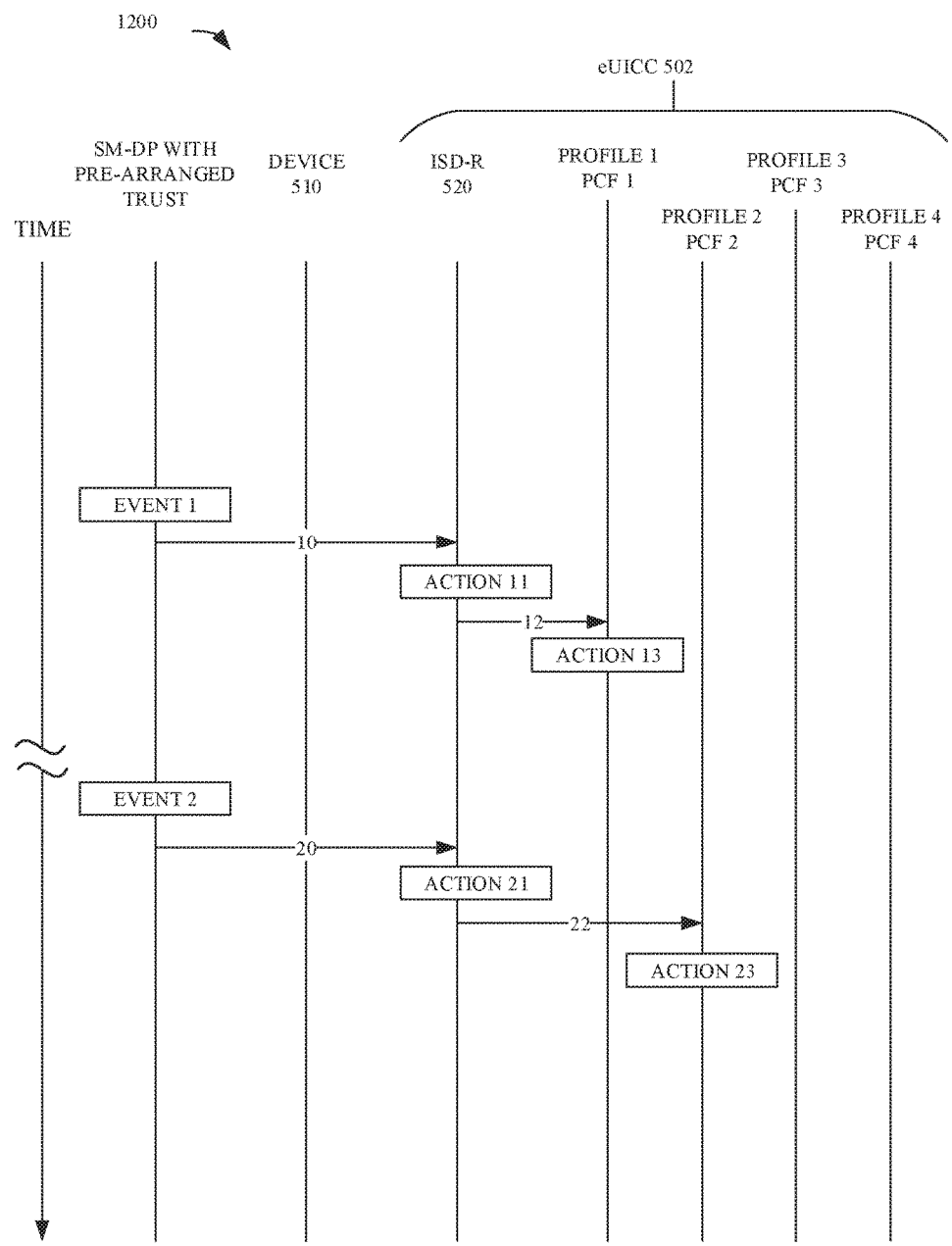
FIG. 12 illustrates exemplary message flows for local and remote profile management of profiles within an eUICC in an exemplary alternative to FIG. 11, according to some embodiments. Rules in policy control functions associated with one or more profiles control application of the profile management commands arriving from outside of the eUICC, according to some embodiments.

FIG. 12 illustrates message flows involving a device, in some embodiments, with four profiles within the eUICC 502 similar to FIG. 6. A policy control function ("PCF") is configured within each profile. Profiles 1 and 2 can be accessed with a first credential, and profiles 3 and 4 can be accessed with a second credential. For the architecture represented by the eUICC 502 participating in message flows as shown in FIG. 12, a profile provider (SM-DP) will pre-arrange trust with the eUICC 502 credential holder (e.g., CI 160). The eUICC 502 is alerted that the SM-DP is trustworthy. This alert creates a secure tie or association between the eUICC 502 and the SM-DP with regard to certain profiles. The SM-DP then has knowledge about the credential configuration in eUICC 502 pertaining to those certain profiles. Credential configuration includes format and authorization information. The SM-DP then has authority to update the security setting of a profile on the eUICC 502.

FIG. 12 illustrates an Event 1 at an SM-DP creating a profile management command message 10 to the eUICC 502. The ISD-R 520, at Action 11, recognizes message 10 as originating with an SM-DP having pre-arranged trust with the eUICC 502. The ISD-R 520 generates message 12 carrying the profile management command of message 10 to profile 1 of the eUICC 502. Profile 1 invokes PCF 1 to determine how to act on the profile management command. If the rules within PCF 1 permit execution of the profile management command, then profile 1 processes the profile management command to carry it out. Event 2 generates a message 20 from the SM-DP to the eUICC 502. Based on the pre-arranged trust relationship, Action 21 leads to message 22 from the ISD-R of the eUICC 502 and then Action 23. PCF 2 of profile 2 evaluates the profile management command corresponding to message 22 and carries it out if the profile management command is permitted by the rules of PCF 2.

In FIG. 12, profiles 3 and 4, in some embodiments, are associated with a second SM-DP associated with the second credential, and where the second SM-DP is different than the SM-DP illustrated in FIG. 12. A message from the SM-DP of FIG. 12 to eUICC 502 invoking the pre-arranged trust relationship would not be forwarded by the ISD-R to profile 3 or 4 because of the lack of the secure tie or association between the SM-DP and the eUICC 502 with regard to profiles 3 and 4. The second SM-DP (not shown in FIG. 12) is in possession of the second credential and has a second pre-arranged trust relationship with the eUICC 502 with regard to profiles 3 and 4, in some embodiments. A message from the second SM-DP to either profiles 3 or 4 would reach the corresponding PCF 3 or 4 for rule checking and execution if permitted by the rules of PCF 3 or 4.

In some embodiments similar to FIG. 12, a single security domain within eUICC 502 exists and the first and second credentials are associated with different authorizations for profile 1, profile 2, profile 3, and profile 4. For example, the first credential enables profile management of profiles 1 and 2, but the first credential is not recognized by the ISD-R of eUICC 502 as being authorized to enable any profile management operations with regard to profiles 3 and 4, in some embodiments. Also, a single policy control function can be performed by the ISD-R rather than performance by individual policy control functions in each profile. The single policy control function performed by the ISD-R operates based on a received profile management command directed to a targeted profile and based on policy rules obtained from the targeted profile, in some embodiments. The term "targeted profile" and the term "addressed profile" bear the same meaning.

In some embodiments, a first policy control function executes profile management commands directed to profile 1 and profile 2 based on the first credential, and a second policy control function executes profile management commands directed to profiles 3 and 4 based on the second credential.

Representative Exemplary Apparatus

Figure 13:
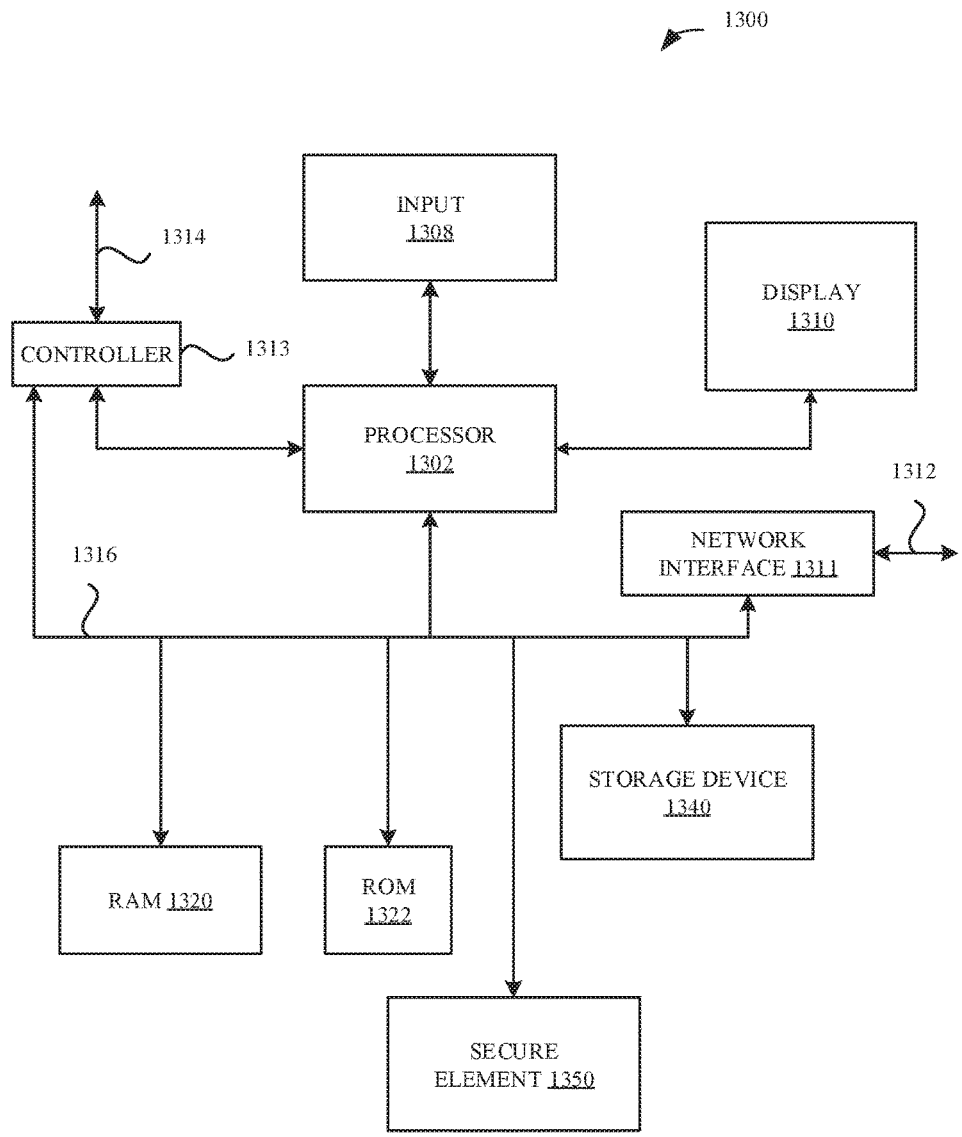
FIG. 13 illustrates an exemplary apparatus for implementation of the embodiments disclosed herein.

FIG. 13 illustrates in block diagram format an exemplary computing device 1300 that can be used to implement the various components and techniques described herein, according to some embodiments. In particular, the detailed view of the exemplary computing device 1300 illustrates various components that can be included in the device 510 and the eUICC 502 illustrated in FIGS. 5-7, FIGS. 10-12 and device 710 in FIG. 7. As shown in FIG. 13, the computing device 1300 can include a processor 1302 that represents a microprocessor or controller for controlling the overall operation of computing device 1300. The computing device 1300 can also include a user input device 1308 that allows a user of the computing device 1300 to interact with the computing device 1300. For example, the user input device 1308 can take a variety of forms, such as a button, keypad, dial, touch screen, audio input interface, visual/image capture input interface, input in the form of sensor data, etc. Still further, the computing device 1300 can include a display 1310 (screen display) that can be controlled by the processor 1302 to display information to the user (for example, information relating to incoming, outgoing, or active communication session). A data bus 1316 can facilitate data transfer between at least a storage device 1340, the processor 1302, and a controller 1313. The controller 1313 can be used to interface with and control different equipment through an equipment control bus 1314. The computing device 1300 can also include a network/bus interface 1311 that couples to a data link 1312. In the case of a wireless connection, the network/bus interface 1311 can include wireless circuitry, such as a wireless transceiver and/or baseband processor.

The computing device 1300 also includes a storage device 1340, which can comprise a single storage or a plurality of storages (e.g., hard drives), and includes a storage management module that manages one or more partitions within the storage device 1340. In some embodiments, storage device 1340 can include flash memory, semiconductor (solid state) memory or the like. The computing device 1300 can also include a Random Access Memory ("RAM") 1320 and a Read-Only Memory ("ROM") 1322. The ROM 1322 can store programs, utilities or processes to be executed in a non-volatile manner. The RAM 1320 can provide volatile data storage, and stores instructions related to the operation of the computing device 1300. The computing device 1300 also includes a secure element 1350, which can comprise, for example, an eUICC.

Some Embodiments

Exemplary eUICC

An exemplary eUICC is described herein. In some embodiments, the eUICC comprises one or more processors; a memory coupled to the processor; a key store comprising a first credential and a second credential; a first profile; and a second profile The memory comprises instructions that when executed by the one or more processors cause the eUICC to perform steps comprising: receiving, from a subscription manager data preparation (SM-DP) via a device, a first profile management command comprising a first signature, determining, using the first credential, that the first signature is authentic, determining, using a first policy control function and based on the first credential, that the first profile management command is permitted, managing the first profile based on the first profile management command, receiving, from the SM-DP via the device, a second profile management command comprising a second signature, determining, using the first credential, that the second signature is authentic, determining, using the first policy control function and based on the first credential, that the second profile management command is permitted, and managing the second profile based on the second profile management command.

In some embodiments, the managing the first profile comprises enabling, disabling, or deleting the first profile, the key store is an eUICC certificate authority security domain (ECASD), and/or the first profile management command is encrypted using a public key of a public key infrastructure (PKI) public key-private key pair of the eUICC.

In some embodiments, the eUICC further comprises a third profile, and the memory comprises further instructions that when executed by the one or more processors cause the eUICC to perform steps further comprising: receiving from a subscription manager secure routing (SM-SR) via the device; a third profile management command comprising a third signature; determining, using the second credential, that the third signature is authentic; determining, using a second policy control function and based on the second credential, that the third profile management command is permitted; and managing the third profile based on the third profile management command.

In some embodiments, the first policy control function is performed by an issuer security domain-root (ISD-R) of the eUICC.

In some embodiments, the determining, using a first policy control function and based on the first credential, that the first profile management command is permitted is based on policy rules obtained by the ISD-R from the first profile.

In some embodiments, the eUICC further comprises a third profile, and the memory comprises further instructions that when executed by the one or more processors cause the eUICC to perform steps further comprising: receiving from a subscription manager secure routing (SM-SR) via the device, a third profile management command comprising a third signature; determining, using the second credential, that the third signature is authentic; determining, by the first policy control function and based on policy rules obtained by the ISD-R from the third profile, that the third profile management command is permitted; and managing the third profile based on the third profile management command.

In some embodiments, the first profile management command is encrypted using a pre-shared symmetric key. In some embodiments, the pre-shared symmetric key in the key store at a time of installation of the first profile by the SM-DP and wherein the SM-DP is an SM-DP+.

The above actions performed by the eUICC may be coded as instructions and the instructions stored in a non-transitory computer readable medium.

Exemplary CRM

Also described herein is a non-transitory computer readable medium (CRM) storing instructions that when executed by a processor in an eUICC cause the eUICC to: receive a first profile management command in a short message service (SMS) message from a subscription manager data preparation (SM-DP), wherein the first profile management command comprises an encrypted and/or integrity-protected information portion and a signature; determine that the signature is authentic; set up a bearer independent secure channel (BIP channel) to the SM-DP responsive to the determining that the signature is authentic; receive a second profile management command comprising second encrypted and/or integrity-protected information over the BIP channel; and provide a prompt message to a user interface using a subscriber identity module (SIM) toolkit (STK) application, wherein the prompt message is based on the first profile management command or on the second profile management command. When a confirmation of the prompt message is received from the user interface: the instructions cause the eUICC to process one or more of the first profile management command or the second profile management command, and send a confirmation message to the SM-DP.

When a confirmation of the prompt message is not received from the user interface, the instructions cause the eUICC to ignore the profile management command.

In some embodiments, the instructions further cause the eUICC to create an encrypted payload for the BIP channel using a pre-shared symmetric key.

In some embodiments, the instructions further cause the eUICC to create an encrypted payload for the BIP channel using a private key of a public key infrastructure (PKI) public key-private key pair associated with the eUICC.

The instructions of the above non-transitory computer readable medium can also be understood as sequences of method steps.

Exemplary Method

Also presented herein is a method by an eUICC, the eUICC comprising: i) an issuer security domain root (ISD-R), ii) an eUICC controlling authority security domain (eCASD) comprising a first credential and a second credential, iii) a first profile, and iv) a second profile. The method includes receiving, at the ISD-R from a first subscription manager data preparation (SM-DP) via a device, a first profile management command comprising a first signature; determining, using the first credential, that the first signature is authentic; determining, using a first policy control function and based on the first credential, that the first profile management command is permitted; processing, by the first profile, the first profile management command; receiving, at the ISD-R from the first SM-DP via the device, a second profile management command comprising a second signature; determining, using the first credential, that the second signature is authentic; determining, using a second policy control function and based on the first credential, that the second profile management command is permitted; and processing, by the second profile, the second profile management command.

In some embodiments of the method, the ISD-P is an ISD-P+. In some embodiments, the first policy control function is based on a GlobalPlatform secure domain privilege assignment.

In some embodiments, the eUICC includes a third profile and the method also includes receiving, at the ISD-R from a second SM-DP via the device and subsequent to the processing by the second profile, a third profile management command comprising a third signature; determining, using the second credential, that the third signature is authentic; determining, using a third policy control function and based on the second credential, that the third profile management command is permitted; and processing, by the third profile, the third profile management command.

In some embodiments, the second policy control function is the first policy control function, the third policy control function is the first policy control function, and the first policy control function is executed by the ISD-R. In some embodiments, the second policy control function is performed by a second ISD-P, wherein the second profile comprises the second ISD-P. In some embodiments, the third policy control function is performed by a third ISD-P, and the third profile comprises the third ISD-P.

The above method steps can also be coded as instructions stored in a non-transitory computer readable medium. The above method steps can also be executed by an eUICC configured to perform the method.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An embedded universal integrated circuit card (eUICC), the eUICC comprising:
   one or more processors;
   a memory coupled to the one or more processors;
   an eUICC-level key store comprising a first credential applicable for remote management of one or more profiles and a second credential applicable for local management of the one or more profiles;
   a first profile of the one or more profiles; and
   a second profile of the one or more profiles, wherein the memory comprises instructions that when executed by the one or more processors cause the eUICC to perform steps comprising:
   receiving, from a subscription manager data preparation (SM-DP) via a device, a first profile management command comprising a first signature and directed to the first profile,
   determining, by an issuer security domain root (ISD-R) using the first credential, that the first signature is authentic,
   forwarding the first profile management command to the first profile,
   determining, using a first policy control function of the first profile, that the first profile management command is permitted,
   managing the first profile based on the first profile management command,
   receiving, via a user interface of the device, a second profile management command comprising a second signature and directed to the first profile,
   determining, by the ISD-R using the second credential, that the second signature is authentic,
   forwarding the second profile management command to the first profile,
   determining, using the first policy control function of the first profile that the second profile management command is permitted, and
   managing the first profile based on the second profile management command.

2. The eUICC of claim 1, wherein the managing the first profile based on the first profile management command comprises enabling, disabling, or deleting the first profile.

3. The eUICC of claim 1, wherein the key store is an eUICC certificate authority security domain (ECASD).

4. The eUICC of claim 1, wherein the first profile management command is encrypted using a public key of a public key infrastructure (PKI) public key-private key pair of the eUICC.

5. The eUICC of claim 1, wherein the eUICC-level key store further comprises a third credential applicable for remote management of the one or more profiles, and wherein the memory comprises further instructions that when executed by the one or more processors cause the eUICC to perform steps further comprising:
   receiving from a subscription manager secure routing (SM-SR) via the device, a third profile management command comprising a third signature and directed to the second profile;
   determining, by the ISD-R using the third credential, that the third signature is authentic;
   determining, by the ISD-R using rules obtained from a second policy control function of the second profile, that the third profile management command is permitted;
   forwarding the third profile management command to the second profile; and
   managing the second profile based on the third profile management command.

6. The eUICC of claim 1, wherein the managing the first profile based on the second profile management command comprises enabling or disabling the first profile.

7. The eUICC of claim 1, wherein the first credential comprises an over-the-air (OTA) key for a mobile network operator to manage remotely the one or more profiles.

8. The eUICC of claim 1, wherein the second credential comprises a biometric credential, a personal identification number (PIN) entry, an embedded secure element (SE) certificate, or a pre-shared key for a user of the device to manage locally the one or more profiles.

9. The eUICC of claim 1, wherein the first profile management command is encrypted using a pre-shared symmetric key.

10. The eUICC of claim 9, wherein the eUICC stores the pre-shared symmetric key in the eUICC-level key store at a time of installation of the first profile by the SM-DP.

11. A non-transitory computer readable medium storing instructions that when executed by a processor in an embedded universal integrated circuit card (eUICC) of a device cause the eUICC to:
   receive a first profile management command in a short message service (SMS) message from a subscription manager data preparation (SM-DP), wherein the first profile management command comprises an encrypted and/or integrity-protected information portion and a signature;
   determine that the signature is authentic;
   set up a secure bearer independent protocol (BIP) channel to the SM-DP responsive to the determining that the signature is authentic;

receive a second profile management command comprising second encrypted and/or integrity-protected information over the BIP channel;

provide a prompt message to a user interface of the device using a subscriber identity module (SIM) toolkit (STK) application, wherein the prompt message is based on the first profile management command or on the second profile management command;

when a confirmation of the prompt message is received from the user interface:
    process one or more of the first profile management command or the second profile management command, and
    send a confirmation message to the SM-DP; and when a confirmation of the prompt message is not received from the user interface:
    ignore the first profile management command and the second profile management command.

12. The non-transitory computer readable medium of claim 11, wherein the instructions further cause the eUICC to:
create an encrypted payload for the BIP channel using a pre-shared symmetric key.

13. The non-transitory computer readable medium of claim 11, wherein the instructions further cause the eUICC to:
create an encrypted payload for the BIP channel using a private key of a public key infrastructure (PKI) public key-private key pair associated with the eUICC.

14. A method performed by an embedded universal integrated circuit card (eUICC), the eUICC comprising: i) an issuer security domain root (ISD-R), ii) an eUICC controlling authority security domain (eCASD) comprising a first credential applicable for remote management of one or more profiles and a second credential applicable for local management of the one or more profiles, iii) a first profile of the one or more profiles, and iv) a second profile of the one or more profiles, the method comprising:
receiving, at the ISD-R from a first subscription manager data preparation (SM-DP) via a device, a first profile management command comprising a first signature and directed to the first profile;
determining, by the ISD-R using the first credential, that the first signature is authentic;
forwarding the first profile management command to the first profile;
determining, using a first policy control function of the first profile, that the first profile management command is permitted;
processing, by the first profile, the first profile management command;

receiving, at the ISD-R via a user interface of the device, a second profile management command comprising a second signature and directed to the first profile;
determining, by the ISD-R using the second credential, that the second signature is authentic;
forwarding the second profile management command to the first profile;
determining, using the first policy control function of the first profile, that the second profile management command is permitted; and
processing, by the first profile, the second profile management command.

15. The method of claim 14, wherein the SM-DP is an SM-DP+.

16. The method of claim 14, wherein the first policy control function is based on a GlobalPlatform secure domain privilege assignment.

17. The method of claim 14, wherein the eCASD further comprises a third credential applicable for remote management of the one or more profiles, the method further comprising:
receiving, at the ISD-R from a subscription manager secure routing (SM-SR) via the device, a third profile management command comprising a third signature and directed to the second profile;
determining, by the ISD-R using the third credential, that the third signature is authentic;
determining, by the ISD-R using rules obtained from a second policy control function of the second profile, that the third profile management command is permitted;
forwarding the third profile management command to the second profile; and
processing, by the second profile, the third profile management command.

18. The method of claim 14, wherein the processing the first profile management command comprises enabling, disabling, or deleting the first profile.

19. The method of claim 14, wherein the processing the second profile management command comprises enabling or disabling the first profile.

20. The method of claim 14, wherein:
the first credential comprises an over-the-air (OTA) key for a mobile network operator to manage remotely the one or more profiles; and
the second credential comprises a biometric credential, a personal identification number (PIN) entry, an embedded secure element (SE) certificate, or a pre-shared key for a user of the device to manage locally the one or more profiles.

* * * * *